(12) United States Patent
Akita et al.

(10) Patent No.: US 10,289,249 B2
(45) Date of Patent: May 14, 2019

(54) INPUT DEVICE

(71) Applicant: HONDA MOTOR CO., LTD., Tokyo (JP)

(72) Inventors: Tatsuya Akita, Wako (JP); Kazufumi Kuroda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/661,299

(22) Filed: Jul. 27, 2017

(65) Prior Publication Data

US 2018/0039377 A1 Feb. 8, 2018

(30) Foreign Application Priority Data

Aug. 2, 2016 (JP) .................................. 2016-151820

(51) Int. Cl.
*G09G 5/00* (2006.01)
*G06F 3/041* (2006.01)
*B60K 35/00* (2006.01)
*G06K 9/00* (2006.01)
(Continued)

(52) U.S. Cl.
CPC ............ *G06F 3/0418* (2013.01); *B60K 35/00* (2013.01); *B60K 37/06* (2013.01); *G06F 3/0488* (2013.01); *G06K 9/00838* (2013.01); *B60K 2350/1024* (2013.01); *B60K 2350/1028* (2013.01); *B60K 2350/352* (2013.01)

(58) Field of Classification Search
CPC .. G06F 3/0418; G06F 3/03547; G06F 3/0416; G06F 2203/04808; G06F 3/017; G06K 9/00838; B60K 35/00; B60K 2350/352; B60K 2350/1028; G09G 2340/145
USPC ........................................................ 345/173
See application file for complete search history.

(56) References Cited

U.S. PATENT DOCUMENTS 6,307,536 B1 * 10/2001 Hada ..................... B62D 6/002
345/157
2003/0234291 A1 * 12/2003 Wulff .................... G06F 3/0202
235/462.48
(Continued)

FOREIGN PATENT DOCUMENTS

JP 2014-48971 A 3/2014

*Primary Examiner* — Jennifer T Nguyen
(74) *Attorney, Agent, or Firm* — Westerman, Hattori, Daniels & Adrian, LLP

(57) ABSTRACT

An input device in which an input operation is performed by an operation allowing an object to contact or come close to an input surface, comprises an input operation identification means for identifying a kind of input operation based on whether or not a movement distance corresponding to a distance that the object moves on the input surface exceeds a predetermined threshold value, a touch time measurement means for measuring touch time corresponding to time during which the object contacts or comes close to the input surface, and a threshold value setting means for setting a distance threshold value. The threshold value setting means sets the distance threshold value in accordance with the touch time such that the distance threshold value with respect to the touch time which is longer than a predetermined touch time is larger than the distance threshold value with respect to the predetermined touch time.

10 Claims, 3 Drawing Sheets

(51) Int. Cl.
 *B60K 37/06* (2006.01)
 *G06F 3/0488* (2013.01)

(56) References Cited

U.S. PATENT DOCUMENTS

2012/0056818 A1* 3/2012 Shafi .................. G06F 3/04883
 345/173
2014/0368260 A1* 12/2014 Tanada ................ G06F 3/04883
 327/517

* cited by examiner

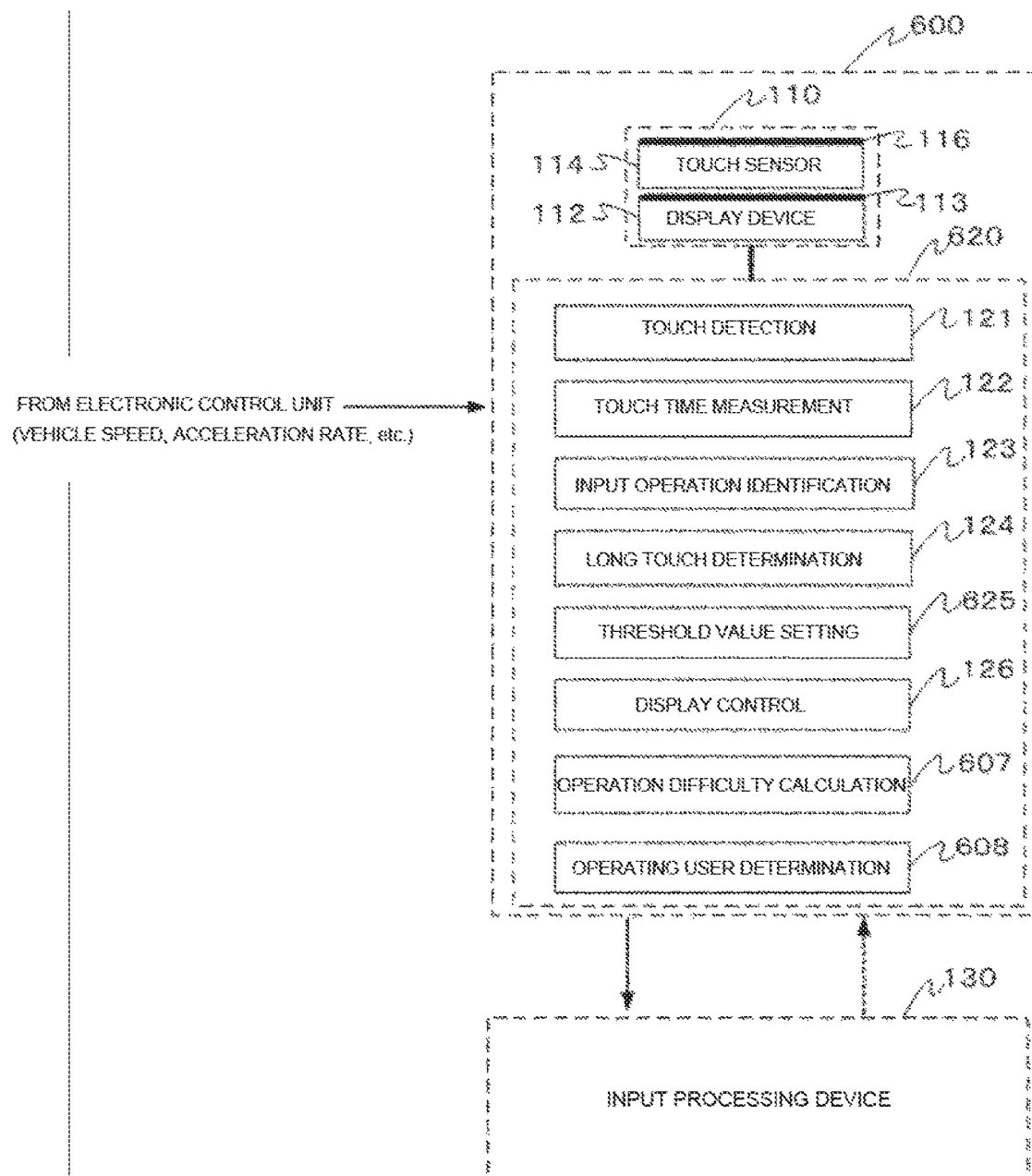

INPUT DEVICE

CROSS-REFERENCE OF RELATED APPLICATION

This application claims priority of Japanese Patent Application No. 2016-151820 filed in Japan on Aug. 2, 2016, the entire contents of which are incorporated herein by reference.

TECHNICAL FIELD

The present invention relates to an input device in which an input operation is performed such that an object such as a finger, a pen (touch pen or stylus) or the like contacts or comes close to a screen, and, more particularly, to the input device which hardly causes an recognition error with respect to the intended input operation even if the finger or the pen moves in the unintended direction, for example, by vibration or shaking within a vehicle.

BACKGROUND OF THE INVENTION

The input device which is operated such that the finger or the like contacts or comes close to the screen is formed by employing, for example, a touch panel and used for a smart phone, a car navigation system, or the like. In this kind of input device, instructions intended by a user are inputted into the input device by a specific movement of the finger (hereinafter, referred to as touch operation) performed in such a way as to contact or come close to the touch panel or the like.

In such touch operation, there may be included a gesture operation attended with movement of a position of the finger on the screen of the input device and a tap operation not attended with the movement of the position of the finger. In the gesture operation, a swipe operation performed by sliding a fingertip, a flick operation performed by moving the fingertip quickly, and the like may be included, for example. In the tap operation, a short tap operation in which the screen is pushed short by the fingertip (for example, tapped by the finger), a long tap operation in which the screen is pushed long by the fingertip, and the like may be included, for example.

In the gesture operation attended with the movement of the position of the finger, for example, when a distance of the movement of the finger which contacts the screen of the input device has become not less than a predetermined threshold value, the gesture operation in accordance with the distance and direction of the movement is identified, so that the input operation in response to the identified operation is executed. Further, in the tap operation not attended with the movement of the position of the finger, for example, the operation is identified based on the number of times of contact and the time of contact in the position concerned, and the input operation in response to the identified operation is executed.

However, even in the case of performing the operation such as the tap operation not attended with the movement of the position of the finger, the position of the finger moves slightly depending upon the usage environment or the like, so that the operation not intended by the user may be executed. For example, in the case where the fingertip has moved in the unintended direction due to the shaking or a sudden stop of the vehicle during performing the long tap operation on the touch panel within the vehicle such as an electric car, a motor car or the like, there is the possibility of being erroneously recognized as other gesture operation such as the flick operation, the swipe operation or the like as a result. In addition, when a frequency of such erroneous recognition is increased, the user feels troublesomeness, and the convenience as the input device may be deteriorated.

Hitherto, as a technique for preventing the error recognition with respect to the user operation in the input device using the touch panel or the like, there is known such a device that the threshold value of the movement distance (movement threshold value) for determining the present or absence of the movement of the finger is changed in accordance with pressing force which is applied from the finger to the screen, in order to correctly recognise the movement of the used finger even when a contact area on the screen is changed depending upon the difference of the fingers used for the touch operation. (Japanese Patent Application Laid-Open Publication No. 2014-48971). In this device, by focusing attention on that the contact area and the pressing force on the screen are different when the fingers are different (for example, in the case of the forefinger and the middle finger), the movement threshold value in accordance with the contact area estimated from the pressing force detected on the screen is set up.

However, in the above prior art, although the error recognition caused due to the difference of the fingers or the like may be solved, the error recognition caused due to the vibration, the shaking or the like within the vehicle as referred to above may not be solved.

SUMMARY OF INVENTION

In view of the above background, in the input device in which the input operation is performed in such a manner as to allow an object such as the finger, the pen (for example, touch pen or stylus) or the like to contact or come close to an input surface, it is desired to realize the input device which hardly causes the recognition error with respect to the input operation intended by the user even if the finger or the pen has moved in the unintended direction by the vibration or the shaking which has been generated suddenly during the input operation.

According to an aspect of the present invention, an input device is configured such that an input operation is performed by an operation in which an object contacts or comes close to an input surface. This input device comprises an input operation identification means (an input operation identification device) for identifying a kind of input operation based on whether or not a movement distance corresponding to a distance that the object moves on the input surface exceeds a predetermined threshold value, a touch time measurement means (a touch time measurement device) for measuring touch time corresponding to time during which the object contacts or comes close to the input surface, and a threshold value setting means (a threshold value setter) for setting a distance threshold value, wherein the threshold value setting means sets the distance threshold value in accordance with the touch time in such a manner that the distance threshold value with respect to the touch time which is longer than a predetermined touch time is configured to be larger than the distance threshold value with respect to the predetermined touch time.

According to another aspect of the present invention, the input device further comprises an operation difficulty calculation means for calculating the degree of difficulty in the input operation performed by the user, from the state of the environment in which the input device is used, wherein the threshold value setting means sets the distance threshold value so as to be larger in value as the degree of difficulty increases.

According to another aspect of the present invention, the input device is mounted on a movable body, and the operation difficulty calculation means calculates the degree of difficulty based on a driving condition of the movable body and/or surrounding conditions of the movable body.

According to another aspect of the present invention, the driving condition of the movable body comprises a present speed of the movable body, an acceleration rate in the vertical direction thereof, an acceleration rate in the transverse direction thereof and/or a steering angle, and the surrounding conditions of the movable body comprise the number of objects detected around the movable body.

According to another aspect of the present invention, the threshold value setting means sets the distance threshold value so as to be increased gradually up to the predetermined value in accordance with the touch time.

According to another aspect of the present invention, when the touch time exceeds a first predetermined time threshold value, the distance threshold value is set so as to be larger in value as compared with the case where the touch time does not exceed the first predetermined time threshold value.

According to another aspect of the present invention, the input device further comprises an operating user identification means for identifying the user who performs the input operation, wherein the threshold value setting means sets the distance threshold value and/or the first predetermined, time threshold value in accordance with a result of the user identification by the operating user identification means.

According to another aspect of the present invention, the input device is mounted, on the movable body, and the operating user identification means identifies whether the user is a driver of the movable body or a passenger other than, the driver. When the user is the driver, the threshold value setting means sets the first predetermined time threshold value so as to be smaller as compared with the case where the user is other passenger than the driver.

According to another aspect of the present invention, when the movement distance does not exceed the distance threshold value and the touch time exceeds a second predetermined time threshold value, the input operation identification means determines that the input operation is an operation not attended with the movement of the object, on the input surface.

DESCRIPTION OF THE DRAWINGS

FIG. 3 is a diagram showing a configuration of the input device according to a second embodiment of the present invention.

DETAILED DESCRIPTION OF EMBODIMENTS OF THE INVENTION

Hereinafter, embodiments of the present invention will be described with reference to the accompanying drawings. Although an input device according to the embodiments to be referred to hereunder is an input device employing a touch panel, etc., which is used, for example, for a smart phone and a car navigation system, the input device of the present invention is not limited to such use but may be applied widely to various purposes.

First Embodiment

Figure 1:
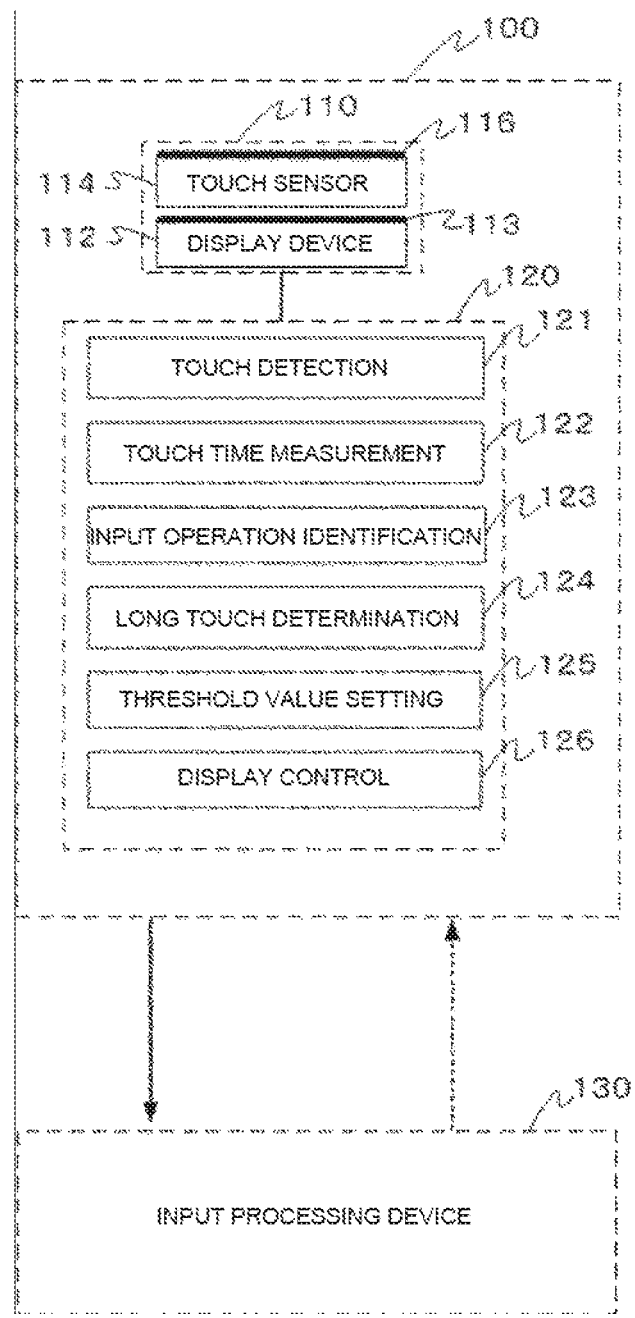
FIG. 1 is a diagram showing a configuration of an input device according to a first embodiment of the present invention.

First, the input device according to the first embodiment of the present invention will be described. FIG. 1 is a block diagram showing a configuration of an input device according to the first embodiment. This input device 100 is connected to an input processing device 130 which processes instructions or data inputted from the input device 100.

Herein, the input device 100 is a device mounted, for example, on an interior of a vehicle, and the input processing device 130 may be configured so as to be a smart phone carried into the vehicle or a navigation system provided in the interior of the vehicle. Alternatively, the whole including the input device 100 and the input processing device 130 may be configured as a single device such as the smart phone, the navigation system, and the like.

The input device 100 includes an input unit 110 for performing an input operation in such a manner that a user allows a finger and the like to contact or come close to the input unity and a processing device 120 for recognizing the input operation and executing predetermined processing.

The input unit 110 is a human interface device (HID, Human Interface Device) on which the user performs the input operation, and, in this embodiment, is configured to be a touch panel, for example. To put it more concretely, the input unit 110 is composed of a display device 112 such as a liquid crystal display (LCD, Liquid Crystal Display), an organic EL display (OELD, Organic ElectroLuminescence Display), and the like, and a touch sensor 114 of a sheet shape which is provided on a display screen 113 (screen) of the display device 112. As the touch sensor 114, any detection system such as a resistance film system, an electrostatic capacitance system or the like may be used, for example, and the user performs the input operation in such a manner as to allow the finger and the like to contact an input surface 116 provided on a surface of the touch sensor. Herein, the input unit 110 may have a function of detecting a position of the object such as the finger or the like which is brought into contact with or comes close to the input surface 116, and is not necessarily required to be the touch panel which is provided with the display screen thereby to detect the contact position of the finger or the like. For example, there may be used the touch panel which has an electrostatic capacitance type touch sensor capable of detecting also the position of the approaching finger or object by heightening the detection sensitivity, and a pen tablet which has only the input surface without provision of the display device.

The input unit 110 displays an object image such as an icon, a button or the like on the display screen 113. When the user allows the finger or the like to contact the position on the input surface 116 corresponding to the object image, a signal including position information (touch position information) of the contact position (touch position) is outputted to the processing device 120. To put it more concretely, the input unit 110 outputs the signal including the touch position information to the processing device 120 at predetermined time intervals, during sensing the contact between the input surface 116 and the finger. By the way, in the following description, although the input operation is performed in such a manner as to allow the finger as an example to contact the input surface 116, the contact, on the input surface 16 is not limited to the finger, and the object such as a pen (touch pen or stylus) or the like may be used.

The processing device 120 is a computer having a processor such as CPU (Central Processing Unit) or the like, ROM (Read Only Memory) in which a program is written, and RAM (Random Access Memory) or the like for temporarily storing data, and is composed of a touch detection unit 121, a touch time measurement unit 122 serving as a touch time measurement means, an input operation identification unit 123 serving as an input operation identification means, a long touch determination unit 124, a threshold value setting unit 125 corresponding to a threshold value setting means, and a display control unit 126.

Each of the units provided in the processing device 120 is materialized when the processing device 120 serving as the computer executes the program, and the computer program can be stored in any storage medium which is readable by the computer. Alternatively or in addition to this, some or all of the above units each may be formed by a hardware including one or more electronic circuit parts.

The touch detection unit 121 receives the touch position information from the input unit 110 and outputs the received touch position information to the input operation identification unit 123 to be referred to later. Further, the touch detection unit 121 detects the contact (touch) of the finger on the input surface 116 when having received the touch position information, whereby to output a touch start signal to the touch time measurement unit 122 (to be referred to later) and to set a touch operation flag indicating that the touch operation is now in progress. Further, the touch detection unit 121, when having not received the touch position information continuously for a predetermined time period or more, resets the touch operation flag. Herein, the touch operation flag may be stored, for example, in a memory (not shown) provided in the processing device 120.

The touch time measurement unit 122, when having received the touch start signal from the touch detection unit 121, starts measurement of time that the finger touches the input surface 116 of the input unit 110, whereby to output the time (touch time) from the touch start to the present to the long touch determination unit 124 (to be referred to later) at predetermined time intervals and to store the same in the memory (not shown) provided in the processing device 120. By the way, this time measurement ends when, the touch, operation on the input surface 116 ends and the touch operation flag is reset, for example, and the measured time is reset to zero.

The input operation identification unit 123 receives the touch position information from the touch detection unit 121 and detects the distance of movement and the direction of the movement of the finger within the input surface 116 of the input unit 110 based on the received touch position information. For example, the input operation identification unit 123 calculates the distance of movement and the direction of movement of the finger based on the touch position of the finger at the time of starting the touch and the touch position of the finger at the present time, from the received touch position information as referred to above. Then, the input operation identification unit 123 identifies a kind of inputted touch operation (flick operation, swipe operation, short, tap operation, long tap operation, etc.) based on the calculated movement distance and movement direction of the finger.

Specifically, when the calculated distance of the movement is larger than a predetermined threshold value (movement distance threshold value: Lth), the input operation identification unit 123 determines that the present touch operation is a gesture operation attended with the lateral movement of the position of the finger along the input surface 116, and further identifies a kind of gesture operation (flick operation, swipe operation, etc.) based on the calculated movement distance and/or movement, direction of the finger. On the other hand, when the calculated distance of the movement of the finger is not more than the movement distance threshold value Lth, the input operation identification unit 123 determines that the inputted touch operation is a tap operation not attended with the lateral movement, of the position of the finger along the input surface 116, and further identifies a kind of tap operation (short tap, long tap, etc.) based on the time of the touch operation (the time during which the finger contacts the input surface 116). Then, the input operation identification unit 123 outputs the information on the identified kind of touch operation to the input processing device 130.

The long touch determination unit 124 compares the touch time measured in the touch time measurement unit 122 with a touch time threshold value (Tth). Then, the long touch determination unit, when the measured touch time is less than the touch time threshold value Tth, determines that it is a touch for a short time (short touch), and, when being not less than Tth, determines that it is a touch for a long time (long touch).

The threshold value setting unit 125 sets values of the movement, distance threshold value Lth and the touch time threshold value Tth which are used each in the input operation identification unit 123 and the long touch determination unit 124. The threshold value setting unit 125, when the touch operation has been started, sets an initial value L1 to Lth and an initial value T1 to Tth, respectively, and thereafter, as occasion arises, changes (or sets) Lth and Tth to different values from these initial values. Herein, the initial values L1 and T1 are stored previously in the memory (not shown) provided in the processing device 120. Further, the initial value L1 may be a value corresponding to a width of a fingertip, for example, and the initial value may be a value corresponding to user's preference, for example.

The display control unit 126 displays, for example, a still image or an animation on the display screen 113 of the display device 112 based on an instruction from the input processing device 130, for example, and controls the display image.

Next, the processing steps in the input device 100 will be described with reference to a flow chart of FIG. 2. This processing starts when a power source of the input device 100 is turned on and ends when being turned off.

When the power source of the input, device 100 is turned on, first, the touch detection unit 121 determines whether or not the finger has touched the input surface 116, namely, whether or not the touch operation has been started (S200). This determination may be performed based on whether or not the touch position signal is outputted from the input unit 110. Then, when the touch operation is not started (S200: No), the touch detection unit 121 returns to Step 200 and repeats the processing.

On the other hand, when the touch operation has been started (S200: Yes), the touch detection unit 121 transmits the touch start signal to the touch time measurement unit 122 and sets the touch operation flag indicating that the touch operation in now in progress.

Figure 2:
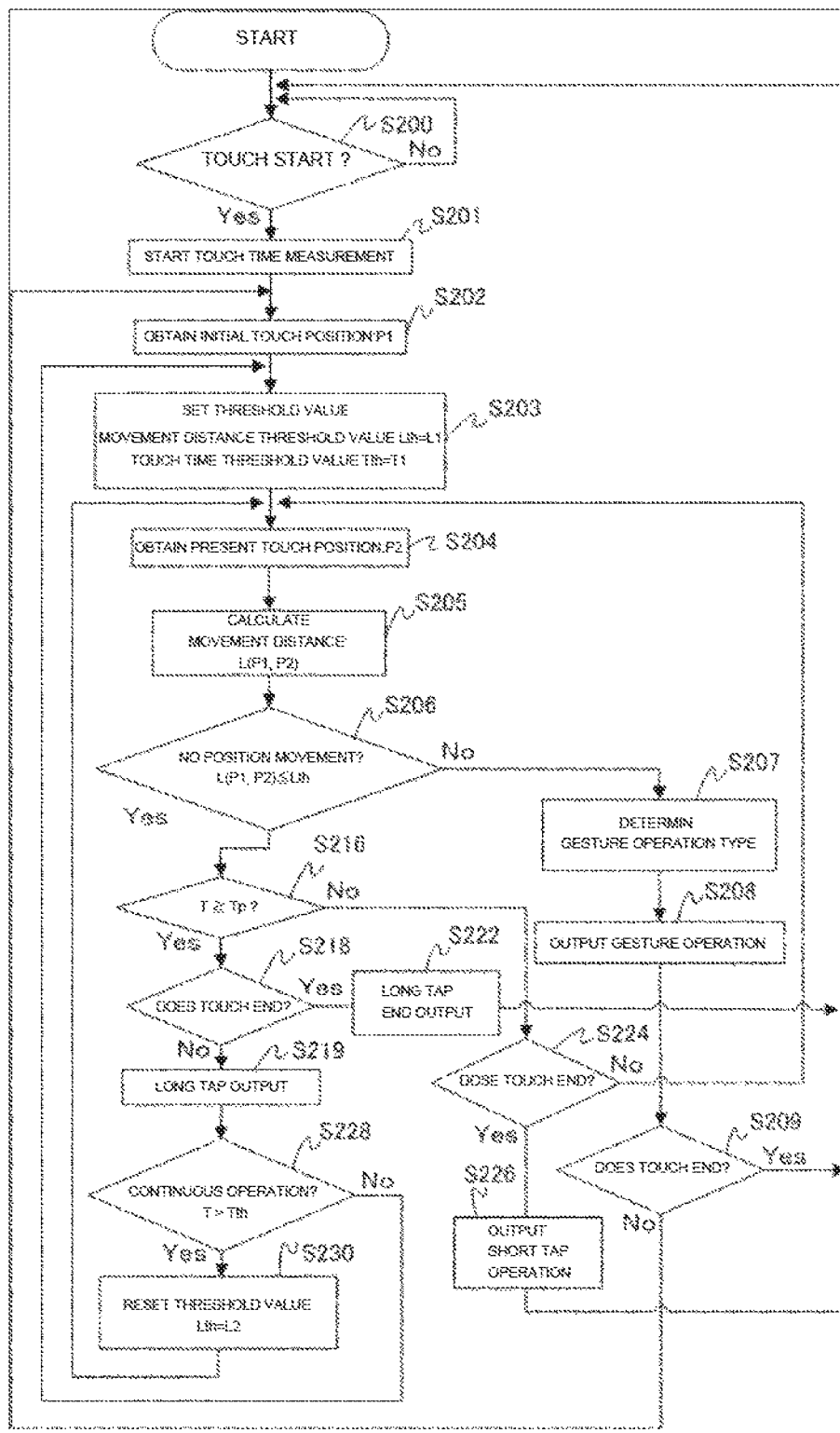
FIG. 2 is a flow chart indicating steps of processing of the input device according to the first embodiment of the present invention.

Herein, the touch, detection unit 121, in parallel with the processing shown in FIG. 2, is configured to output all the touch position information received from the input unit 110, to the input operation identification unit 123. Moreover, the touch detection unit 121, in parallel with the processing shown in FIG. 2, monitors a reception state of the touch position information from the input unit 110, and, when having not received the touch position information for the predetermined time period or more, resets the touch operation flag. Consequently, the input operation identification unit 123 refers to the touch operation flag and, when the flag is reset, is able to determine that the touch operation has been ended, for example.

Next, the touch time measurement unit 122 starts measurement of the touch time (S201) when the touch start signal has been received from the touch detection unit 121. At that time, the touch time measurement unit 122 stores the measured touch time, for example, in the memory (not shown) provided in the processing device 120. As a result, the input operation identification unit 123 and the long touch determination unit 124, for example, are able to refer to the touch time measured by the touch time measurement unit 122.

Next, the input operation identification unit 123 stores the touch position indicated by the touch position information which is received from the touch sensor of the input surface 116 of the input unit 110, as an initial touch position P1 (S202). Further, the threshold value setting unit 125 sets the movement distance threshold value Lth used at the time the input operation identification unit 123 determines the presence or absence of the movement of the finger, to the initial value L1, and sets the touch time threshold value Tth to be used at the time the long touch determination unit 124 determines the kind of touch (long touch or short touch), to the initial value T1 (S203).

Next, the input operation identification unit 123 identifies the present touch position of the finger obtained from the touch position information which is received through the touch detection unit 121 from, the input unit 110 at the predetermined time intervals, as a present touch position P2 (S204), and calculates the movement distance L (P1, P2) of the finger within the input surface 116 of the input unit 110, based on the present touch position P2 and the initial touch position P1 obtained in Step S202 (S205).

Next, the input operation identification unit 123 determines whether or not the movement distance L (P1, P2) is not more than the movement distance threshold value Lth (S206). When L (P1, P2) is more than Lth (S206: No), it determines that the movement of the finger on the input surface 116 is the gesture operation attended with the movement of the finger and further identifies the kind of gesture operation (for example, swipe operation, flick operation, etc.) as the kind of present touch operation (S207). Further, the input operation identification unit 123 outputs the information (input operation information) indicating the kind of identified present touch operation, for example, to the input processing device 130 (S208). As a result, the input processing device 130 executes a predetermined operation (for example, display of the object image on the display device 112 of the input device 100) in accordance with the kind of touch operation indicated by the input operation information.

Next, the input operation identification unit 123 refers to a touch operation flag thereby to determine whether or not the touch operation ends (S209) and, when the touch operation ends (S209: Yes), returns to Step S200 so as to repeat the processing. On the other hand, when the touch operation is continued (S209: No), it returns to Step S204 and repeats the processing.

Returning to Step S206, when L (P1, P2) is not more than Lth (S206: Yes), the input operation identification unit 123 determines that the present touch operation is the tap operation not attended with the movement of the finger and determines whether or not the touch time T is not less than a predetermined threshold value Tp (S216). Then, when the touch time T is not less than the threshold value Tp (S216: Yes), it refers to the touch operation flag thereby to determine whether or not the touch operation ends (S218). When the touch operation does not end (S218: No), it identifies the present touch operation as the start or the continuation of the long tap operation and outputs the input operation information indicating the result of the identification (namely, the start or the continuation of the long tap operation) to the input processing device 130 (S219), whereby the processing is moved to Step S228.

On the other hand, when it is determined that the touch operation ends in Step S218 (S218: Yes), the input operation identification unit 123 determines that the long tap operation has ended, and outputs the input operation information indicating that the long tap operation has ended, to the input processing device 130 (S222). Thereafter, returning to Step S200, the processing is repeated.

On the other hand, in Step 216, when it is determined that the touch time T is less than the threshold value Tp (S216: No) (the input operation identification unit 123 determines whether or not the touch operation ends (S224). When the touch operation ends (S224: Yes), it identifies the present touch operation as the short tap operation thereby to output the input operation information, for example, to the input processing device 130 (S226), and returns to Step S200 so as to repeat the processing. On the other hand, when the touch operation does not end (S224: No), the input operation identification unit 123 returns to Step S204 so as to repeat the processing.

Next, the long touch determination unit 124 refers to the touch time T measured by the touch time measurement unit 122 and determines whether or not the touch time T exceeds the touch time threshold value Tth (S228). When the touch time T is not more than the touch time threshold value Tth (T≤Tth) (S228: No), it returns the processing to Step S203.

On the other hand, when the touch time T is more than touch time threshold value Tth (T>Tth) (S228: Yes), the long touch determination unit 124 transmits the signal indicating such effect to the threshold value setting unit 125. The threshold value setting unit 125, when having received the signal, sets the movement distance threshold value Lth to L2 which has the predetermined value larger than the initial value L1 (S230) and the processing is moved to Step S204.

By the way, the movement distance threshold value Lth which is changed from the initial value L1 to L2 is returned to the initial value L1 at the time the processing of FIG. 2 is restarted and Step S203 is executed when the touch operation ends and the touch operation is started again (namely, when the finger touches again the input surface 116 after the finger is separated from the input surface 116).

Further, the touch time when the touch time measurement unit 122 starts the measurement in Step S201 may be reset to zero, for example, when the touch operation flag is reset in the case where the touch time measurement unit 122 refers to the touch operation flag at regular intervals.

Further, this processing (FIG. 2) ends when the power source of the input device 100 is turned off.

According to the above processing, since the movement distance threshold value Lth is set to the larger value L2 than the initial value L1 in the case where the touch time T exceeds the touch time threshold value Tth, the movement of the finger (touch operation) is recognized to be the gesture operation only when the finger is moved to a greater extent as compared with that immediately after the touch operation is started. As a result, even if the unintended movement of the finger which exceeds the value L1 has been generated clue to the sudden vibration or shaking of the interior or the like of the vehicle, the error recognition with respect to the input operation is not caused as far as the distance L of the unintended movement of the finger remains less than the value L2, and the input operation intended by the user is correctly recognized.

Further, the change of the movement distance threshold value Lth from the initial value L1 to L2 (Step S230) is the processing which is executed only when the touch time T is determined, as "the long touch" which exceeds the touch time threshold value Tth (when Step S228 is Yes). Therefore, in the case of other gesture operation such as the short tap operation, the flick operation or the like that the touch time is shorter than the touch time threshold value Tth, the change of the movement distance threshold value Lth from the initial value L1 to L2 is not performed, and such other gesture operation can be correctly identified as usual.

By the way, in the flow chart shown in FIG. 2, it is determined that, when the movement distance L of the touch position exceeds the movement distance threshold value Lth, the present touch operation is the gesture operation attended with the movement of the finger. However, without being limited to this, when the touch time has exceeded a predetermined period of time, the present touch operation may be processed so as not to be the gesture operation attended with the movement of the finger (namely, so as to be the tap operation not attended with the movement of the finger), for example, by skipping (not executing) the processing of Step S206. Consequently, in the case where the user intends to perform the long tap operation and continues the touch operation without movement of the finger beyond the above predetermined period of time, even if the unintended movement of the finger occurs afterwards, the unintended movement is not recognized as the gesture operation, so that the long tap operation intended by the user continues to be correctly recognized.

Further, in this embodiment, although L2 is the predetermined fixed value, without being limited to this, it may be set as a value which gradually increases up to a predetermined maximum value in accordance with the touch time T. For example, the threshold value setting log unit 125, in Step S230 of FIG. 2, calculates L2 with following equations (1) and (2) and may set the calculated L2 as Lth.

Let $Tth < T < T2$, $L2 = \alpha \times (T - Tth) + L1$     (1)

Let $T > T2$, $L2 = \alpha \times (T2 - Tth) + L1$     (2)

Herein, T is the touch time. Accordingly, when the touch time T exceeds Tth, L2 may increase gradually up to the maximum value [$\alpha \times (T2-Tth)$] at an inclination to be determined by a proportionality coefficient $\alpha$.

Further, in the flow chart shown in FIG. 2, when the touch operation ends in a condition where the touch time T is less than the predetermined threshold value Tp, the touch operation is determined as the short tap operation (S216, S224) and the input operation information is outputted (S226), whereby to wait for start of another touch operation by returning to Step S200. However, without being limited to this, when the one short tap operation is identified in Steps S216 and S224, the time (interval) until the following touch operation is started is measured, and, in the case where the following touch operation is the short tap operation and the interval is shorter than the predetermined time in a newly executed Step S216 or S224, the one short tap operation and the following short tap operation may be identified as a series of operation. In this way, double operation may be identified, for example.

Second Embodiment

Next, the input device according to the second embodiment, of the present invention will be described.

Generally, the degree of influence that the vibration and the shaking in the surrounding environment of the user (for example, the vibration and the shaking of the vehicle on which the user rides) exert on the touch operation of the user is dependent, on how much the user can concentrate on the touch operation or how much the user can not concentrate on the touch operation (hereinafter, referred to as degree of operation difficulty). In other words, in the case where the degrees of the vibration and shaking in the environment are the same, the touch operation which the user who can concentrate on the touch operation (who is low in degree of operation difficulty) performs is smaller in extent (dimensions) of the movement of the finger unintended by the user as compared with the touch operation which the user who cannot concentrate on the touch operation (who is high in degree of operation difficulty) performs, so that the recognition error with respect to the operation intended by the user is hardly caused.

In the input device 100 according to the first embodiment, L2 which is set for the movement distance threshold value Lth when the touch time T has become more than the time threshold value Tth is the predetermined fixed value, so that, at the time of setting the movement distance threshold value Lth, the degree of operation difficulty of the user when the touch operation is performed is not considered. Accordingly, in the case where the value of L2 is set at a large value in accordance with the user who is high in degree of operation difficulty, for the user who performs the operation in a condition that is low in degree of operation difficulty, the gesture operation is not recognized unless unnecessarily large movement of the finger is performed, so that there may be cases where the user feels troublesomeness.

In comparison with the above, in the input device according to this embodiment, particularly, on the supposition that the input device is provided within the movable body (for example, within the vehicle), the movement distance threshold value Lth is determined based on the degree of operation difficulty determined by the driving conditions of the movable body (for example, a speed, an acceleration rate, a steering angle, etc.) the surrounding environment of the movable body (for example, the number of objects existing in circumference), and/or a kind of operator of the touch operation (for example, whether or not the operator is the driver of the movable body) other than relative length of the touch time.

Accordingly, in the input device according to this embodiment, the recognition error with respect to the input operation intended by the user can be prevented or suppressed while properly keeping the sensitivity identifying the gesture operation in accordance with the degree of operation difficulty of the operator who performs the touch operation. For example, since the driver is higher in degree of operation difficulty than a fellow passenger and the degree of operation difficulty increases as the speed, the acceleration rate and/or the steering angle of the movable body increase, the movement distance threshold value Lth when the operator is the driver is set so as to be larger in value than the case where the operator is the fellow passenger, and/or the movement distance threshold value Lth is set so as to be larger in value as the speed, the acceleration rate and the steering angle of the movable body increase.

FIG. 3 is a diagram showing the configuration of the input device 600 according to the embodiment of the present invention. Herein, this input device 600 is provided and used within the vehicle as the movable body. In addition, in the input device 600 shown in FIG. 3, component elements identical to those of the input device 100 shown in FIG. 1 are given reference characters corresponding to FIG. 1, and the description with respect to FIG. 1 will be applied by analogy.

Although this input device 600 has a similar configuration to the input device 100 according to the first embodiment, it is different, in that it has a processing device 620 instead of the processing device 120. Moreover, although the processing device 620 has a similar configuration to the processing device 120. It is different in that it has a threshold value setting unit 625 instead of the threshold value setting unit 125. In addition, the processing device 620 further comprises an operation difficulty calculation unit 607 corresponding to an operation difficulty calculation means, an operating user identification unit 608 corresponding to an operating user identification means, a surrounding condition detection unit 604, and a user detection unit 605. Further, the processing device 620, similarly to the processing device 120, is the computer having the processor such as CPU or the like, ROM in which a program is written, and RAM or the like for temporarily storing the data. Each of the units provided in the processing device 620 is materialized when the processing device 620 serving as the computer executes the program. Alternatively or in addition to this, some or all of the above units each may be formed by the hardware including one or more electronic circuit parts. Herein, the computer program executed by the processing device 620 can be stored in any storage medium which is readable by the computer.

Further, the input device 600 is connected to the input processing device 130 and also connected to the electronic control unit (ECU, Electronic Control Unit) of the vehicle (hereinafter, referred to as own vehicle) in which the input device 600 is provided, so that it receives the speed (vehicle speed) and the acceleration rate (for example, the acceleration rate in the vertical direction which is the acceleration rate along the traveling direction of the own vehicle) of the own vehicle, and an image of the surrounding environment of the own vehicle and an image of the interior of the own vehicle from the cameras provided in the own vehicle.

The surrounding condition detection unit 604 obtains the image of the surrounding environment from the electronic control unit provided in the own vehicle and detects, from the obtained image, an object located in front of the vehicle (for example, other vehicle or a pedestrian) for example, thereby to output the number of the detected objects (surrounding objects) to the operation difficulty calculation unit 607.

The operation difficulty calculation unit 607 calculates the degree of operation difficulty of the touch operation relative to the input device 600 in the interior environment of the own vehicle as the movable body and outputs the calculated degree of operation difficulty to the threshold setting unit 625. In this embodiment, the operation difficulty calculation unit 607 calculates the degree of operation difficulty based on the speed, the acceleration rate and the steering angle of the own vehicle received from the electronic control unit provided in the own vehicle, the number of surrounding objects outputted from the surrounding condition detection unit 604, and identified information whether or not the operator of the touch operation is the driver, from the operating user identification unit 608 to be referred to later.

For example, the operation difficulty calculation unit 607 decides scores with respect to each of the present speed, the acceleration rate, the steering angle, the number of surrounding objects and the kind of operator based on the present speed, the acceleration rate and the steering angle received from the electronic control unit, the number of surrounding objects received from the surrounding condition detection unit 604, and the information on the kind of operator (driver or not, etc.) identified by the operating user identification unit 608, and applies weight-summing to the decided scores, whereby to be able to calculate the degree of operation difficulty.

As for the scores, for example, maps (score maps) in which scores are prescribed in accordance with ranges of values with respect to each of the speed, the acceleration rate, the steering angle (for example, absolute value thereof) and the number of surrounding objects are previously defined thereby to be stored in the memory (not shown), and a map in which, scores are prescribed in accordance with the kinds of operators (for example, whether the driver or not) is previously defined thereby to be stored in the memory. The operation difficulty calculation unit 607 refers to these score maps whereby to be able to decide each of the scores at the present time.

Further, the score maps may be prescribed, for example, such that, with increase, of the speed, the acceleration rate, the steering angle (for example, absolute value thereof), and the number of surrounding objects, and when the operator of the input device 600 is the driver as compared with when it is a passenger other than the driver, the values of the scores corresponding to those have larger values. For example, the scores of the speed may be prescribed so as to take the values 0, 1, 2, 3 and 4 each with respect to ranges of the speed of less than 30 km/h, the speed of not less than 30 km/h to less than 50 km/h, the speed of not less than 50 km/h to less than 70 km/h, the speed of not less than 70 km/h to less than 100 km/h and the speed of not less than 100 km/h, and the scores of the rate of acceleration, the steering angle and the number of surrounding objects may also be prescribed in the same manner as the scores of the speed. Further, the scores of the operator may be prescribed in such a manner as to take the value 0 when it is not the driver and the value 4 when it is the driver, for example.

In the above case, for example, the degree D of operation difficulty is calculated as follows.

$$D = (a \times Ss + b \times Sa + c \times S\theta + d \times Sp + e \times So) \div S\,max\,1$$

Herein, Ss, Sa, Sθ, Sp and So are the scores of the speed, the acceleration rate, the steering angle, the number of surrounding objects and the kind of operator, respectively, and a, b, c, d and e are weighting coefficients. Further, Smax 1 is a value of (a×Ss+b×Sa+c×Sθ+d×Sp+e×So) when ail of the scores of Ss, Sa, Sθ, Sp and So with respect to the speed, the acceleration rate, the steering angle, the number of surrounding objects and the kind of operator are maximum values, namely, a maximum value of (a×Ss+b×Sa+c×Sθ+d×Sp+e×So). Accordingly, the degree of operation difficulty is given in the range of 0 to 1. Moreover, when the score map is prescribed in the similar way as the above example, the degree D of operation difficulty is calculated as a larger value as the values of the speed, the acceleration rate, the steering angle (absolute value thereof) and the number of surrounding objects increase and when the operator is the driver as compared with when it is other passenger than the driver.

Alternatively, instead of prescribing the scores with respect to each of the speed, the acceleration rate and the steering angle as described above, the score map in which the corresponding relationship between a combination of three values of the speed, the acceleration rate and the steering angle and the scores is prescribed, may be defined in such a manner that the correlation between a combination of the values of three parameters of the speed, the acceleration rate and the steering angle and the movement distance of the finger occurred without intention is obtained in advance, and the scores are prescribed in accordance with the range of movement distance. In this case, the operation difficulty calculation unit 607 may prescribe the degree of operation difficulty from the scores prescribed in accordance with the combination of three values of the speed, the acceleration rate and the steering angle and the scores with respect to the number of surrounding objects. Then, the degree of operation difficulty D is calculated in the following way, for example.

$$D=(f \times Si + g \times Sp + h \times So) \div S \max 2$$

Herein, Si is a score prescribed from the combination of the values of the speed, the acceleration rate and the steering angle. Sp and So, as described above, are the scores with respect to the number of surrounding objects and the operator, respectively. Further, f, g and h are weighting coefficients. In addition, Smax 2 is a value of (f×Si+g×Sp+h×So) when all the scores Si, Sp and So are maximum scores, namely the maximum value of (f×Si+g×Sp+h×So). Accordingly, the degree of operation difficulty is given in the range of 0 to 1.

By the way, the calculation method of the degree of operation difficulty, without being limited to the above, may employ any method capable of evaluating the difficulty of the touch operation within the vehicle as the movable body in an integrated manner. For example, instead of or in addition to the speed, the acceleration rate, the steering angle and the number of surrounding objects, the degree of congestion of vehicles obtained from traffic congestion information received through the communication between the vehicles or the communication between a road and the vehicle, the degree of unevenness of a road surface obtained from an on-vehicle acceleration sensor, and the like may be used for calculation of the degree of operation difficulty.

The operating user identification unit 608 determines whether or not the operator of the touch operation relative to the input device 600 is the driver from the display of the interior of the own vehicle which is received from the electronic control unit provided in the own vehicle. Then, the operating user identification unit 608 outputs the result of the determination to the operation difficulty calculation unit 607 and the threshold setting unit 125.

Although the threshold setting unit 625 has a similar configuration to the threshold setting unit 125 of the input device 100 according to the first embodiment, it is different in that L2 and T1 are calculated based on the degree of operation difficulty. In other words, in the threshold setting unit 125, L2 set for the movement distance threshold value Lth is the predetermined fixed value and T1 set for the touch time threshold value Tth also is the predetermined fixed value. However, in the threshold value setting unit 625, each of L2 and T1 is calculated adaptively based on the degree of operation difficulty.

For example, the threshold setting unit 625 calculates L2 and T1 as a value increasing with increase of the degree D of operation difficulty and a value decreasing with increase of the degree D of operation difficulty, respectively.

To put it more concretely, the threshold setting unit 625 calculates L2 and T1 as the value which increases in proportion to the degree D of operation difficulty and the value which decreases in proportion to the degree D of operation difficulty by the following equations (3) and (4).

$$L2 = j \times D + k \qquad (3)$$

$$T1 = -m \times D + n \qquad (4)$$

Herein, j and m are proportionality coefficients, and k and n are offset, values giving minimum values of L2 and T1, respectively. Herein, j, k, m and n are positive real numbers. Particularly, k may be set to the same value as L1 or a larger value than L1, for example.

Further, the input device 600 according to this embodiment executes the same processing as the processing in the input device 100 according to the first embodiment shown in FIG. 2 except the processing with respect to the decision of the values of T1 and L2. Therefore, to the description other than the matter of the decision of the values of T1 and L2, the description of FIG. 2 as referred to above will be applied by analog y.

Further, although, in this embodiment, the operating user identification unit 608 determines whether or not the operator of the input operation (touch operation) relative to the input device 600 is the driver, based on the display from the camera which is provided in the own vehicle as the movable body so as to take a picture of the interior of the vehicle, without being limited to this, it may determine whether or not the operator is the driver, based on, for example, the input surface 116 and the angle of the object which contacts or comes close to the input surface 116, instead of the display of the interior of the vehicle from the camera. Such angle of the object may be specified from capacity distribution on the input surface, for example, by forming the input, unit 110 as an electrostatic capacitance type touch sensor. Moreover, in the case where it determines the position of the operator within the vehicle (for example, whether the operator is the fellow passenger seated on a front seat or the fellow passenger seated on a rear seat, etc.) and the distinction of an adult or a child, etc. other than the identification whether or not the operator of the input operation is the driver, the movement distance threshold value Lth and the time threshold value Tth may be configured so as to be changed in accordance with the identification of the kind of the user obtained as a result of the identification thereof.

Further, in this embodiment, although the speed, the acceleration rate (for example, the acceleration rate in the vertical direction along the traveling direction of the movable body) and/or the steering angle are used as the driving condition of the movable body, the acceleration rate in the transverse direction (the acceleration rate along the direction perpendicular to the traveling direction of the movable body) may be used instead of the steering angle.

Further, in this embodiment, although the value of T1 set for the time threshold value Tth is determined in accordance with the degree D of operation difficulty, without being limited to this, the value of T1 may be set so as to be smaller (shorter) when the operator is the driver as compared with when the operator is other passenger than the driver, based on only whether or not the operator is driver.

As described hereinabove, in the input device 100, 600 of the present invention, when the time (touch time) after the touch operation is started exceeds the predetermined time threshold value, the movement distance threshold value for determining whether or not the touch operation is the gesture operation attended with the movement of the finger, based on the movement distance of the finger in the touch operation is set so as to be longer. As a result, even in the case where the finger or the touch pen is moved suddenly in the unintended direction due to the vibration, the shaking and the like in the middle of the input operation when the time of the input operation (touch operation) is longer to a certain degree, it is possible to prevent the intended input operation from being recognized erroneously.

Further, the present invention is not limited to the embodiment thereof or modified examples 1~4 thereof. For example, the desired input device or processing flow may be configured by combining the above referred embodiment and the modified example 1~4 as needed, and the present invention may be used by making changes and modifications therein without departing from the spirit and scope thereof.

DESCRIPTION OF REFERENCE CHARACTERS

100, 600: Input device, 110: Input unit, 112: Display device, 113: Display screen, 114: Touch sensor, 116: Input surface, 120, 620: Processing device, 121: Touch detection unit, 122: Touch time measurement unit, 123: Input operation identification unit, 124: Long touch determination unit, 125, 625: Threshold value setting unit, 126: Display control unit, 130: Input processing device, 607: Operation difficulty calculation unit, 608: Operating user determination unit

The invention claimed is:

1. An input device operable by a user allowing an object contact or come close to an input surface of the input device and configured to identify a user's input operation among different types of input operations, the input device comprising:
   an input operation identification means for identifying the user's input operation based on whether or not a movement distance corresponding to a distance that the object moves along the input surface exceeds a distance threshold value;
   a touch time measurement means for measuring touch time during which the object contacts or comes close to the input surface; and
   a threshold value setting means for setting the distance threshold value and allowing the distance threshold value to vary depending upon the touch time measured by the touch time measurement means such that the distance threshold value set to the input operation having the measured touch time which is longer than a predetermined touch time is larger than the distance threshold value set to the input operation having the measured touch time which is the predetermined touch time,
   wherein the input device is mounted on a movable body.

2. The input device according to claim 1, further comprising an operation difficulty calculation means for calculating a degree of difficulty in the input operation performed by the user, from a state of environment in which the input device is used,
   wherein the threshold value setting means sets the predetermined distance threshold value so as to be larger in value as the degree of difficulty increases.

3. The input device according to claim 2, wherein the operation difficulty calculation means calculates the degree of difficulty based on a driving condition of the movable body and/or surrounding conditions of the movable body.

4. The input device according to claim 3, wherein the driving condition of the movable body comprises a current speed of the movable body, an acceleration rate in a vertical direction thereof, an acceleration rate in a transverse direction thereof and/or a steering angle, and the surrounding conditions of the movable body comprise a number of objects detected around the movable body.

5. The input device according to claim 1, wherein the threshold value setting means sets the predetermined distance threshold value so as to be increased gradually as the touch time increases.

6. The input device according to claim 1, wherein, when the touch time exceeds the predetermined touch time which is a first predetermined time threshold value, the threshold value setting means sets the distance threshold value so as to be larger in value as compared with a case where the touch time does not exceed the first predetermined time threshold value.

7. The input device according to claim 6, further comprising an operating user identification means for identifying the user who performs the input operation,
   wherein the threshold value setting means sets the distance threshold value and/or the first predetermined time threshold value in accordance with a result of the user identification by the operating user identification means.

8. The input device according to claim 7,
   wherein the input device is mounted on the movable body, and the operating user identification means identifies whether or not the user is a driver of the movable body or a passenger other than the driver, and
   wherein, when the user is the driver, the threshold value setting means sets the first predetermined time threshold value so as to be smaller as compared with a case where the user is the passenger other than the driver.

9. The input device according to claim 1, wherein the different types of input operations comprise an operation which involves a movement of the object along the input surface and an operation which does not involve the movement, and
   wherein when it is detected that the movement distance does not exceed the distance threshold value and the touch time exceeds a second predetermined time threshold value, the input operation identification means determines that the input operation is the operation which does not involve the movement of the object along the input surface.

10. An input device operable by a user allowing an object to contact or come close to an input surface of the input device and configured to identify user's input operation among different types of input operations, the input device comprising:
    an input operation identification device configured to identify the user's input operation based on whether or not the movement distance corresponding to a distance that the object moves along the input surface exceeds a distance threshold value;
    a touch time measurement device configured to measure touch time during which the object contacts or comes close to the input surface; and
    a threshold value setter configured to set the distance threshold value and allow the distance threshold value to vary depending upon the touch time measured by the touch time measurement device such that the distance threshold value set to the input operation having the touch time which is longer than a predetermined touch time is larger than the distance threshold value set to the input operation having the measured touch time which is the predetermined touch time,
    wherein the input device is mounted on a movable body.

* * * * *